US010713987B2

(12) United States Patent
Huang et al.

(10) Patent No.: US 10,713,987 B2
(45) Date of Patent: Jul. 14, 2020

(54) DISPLAY PANEL AND DISPLAY DEVICE

(71) Applicant: SHANGHAI AVIC OPTO ELECTRONICS CO., LTD., Shanghai (CN)

(72) Inventors: Zhengyuan Huang, Shanghai (CN); Shuquan Fan, Shanghai (CN); Xupeng Wang, Shanghai (CN); Shanrong Wang, Shanghai (CN); Zhi Zheng, Shanghai (CN)

(73) Assignee: SHANGHAI AVIC OPTO ELECTRONICS CO., LTD., Shanghai (CN)

(*) Notice: Subject to any disclaimer, the term of this patent is extended or adjusted under 35 U.S.C. 154(b) by 143 days.

(21) Appl. No.: 15/886,839

(22) Filed: Feb. 2, 2018

(65) Prior Publication Data

US 2018/0158389 A1 Jun. 7, 2018

(30) Foreign Application Priority Data

Oct. 25, 2017 (CN) .......................... 2017 1 1009502

(51) Int. Cl.
G09G 3/20 (2006.01)
G06F 3/048 (2013.01)

(52) U.S. Cl.
CPC .............. G09G 3/20 (2013.01); G06F 3/048 (2013.01); G09G 2310/0264 (2013.01); G09G 2310/0291 (2013.01); G09G 2320/0247 (2013.01)

(58) Field of Classification Search
CPC ............. G09G 3/20; G09G 2310/0291; G09G 2330/021; G06F 3/048
See application file for complete search history.

(56) References Cited

U.S. PATENT DOCUMENTS 6,489,942 B1 * 12/2002 Chiba ................. G09G 3/3622
345/100
9,143,090 B2 * 9/2015 Seo, II .................... H03F 1/308
(Continued)

FOREIGN PATENT DOCUMENTS

CN 201556159 U 8/2010
CN 106383611 A 2/2017
CN 106971686 A 7/2017

Primary Examiner — Nitin Patel
Assistant Examiner — Robert M Stone
(74) Attorney, Agent, or Firm — Kilpatrick Townswend & Stockton, LLP

(57) ABSTRACT

Provided are a display panel and a display device. The display panel includes a drive chip and a switching device, and the drive chip includes a digital interface inputting terminal, a positive driving voltage inputting terminal and a negative driving voltage inputting terminal, and the switching device includes a first switching inputting terminal, a second switching inputting terminal, a third switching inputting terminal, a switching control terminal, a first switching outputting terminal corresponding to the first switching inputting terminal, a second switching outputting terminal corresponding to the second switching inputting terminal and a third switching outputting terminal corresponding to the third switching inputting terminal. The first switching inputting terminal, the second switching inputting terminal, the third switching inputting terminal and the switching control terminal are configured to be electrically connected to a main circuit board. The first switching outputting terminal is electrically connected to the digital interface inputting terminal.

17 Claims, 10 Drawing Sheets

(56) References Cited

U.S. PATENT DOCUMENTS

| | | | | |
|---|---|---|---|---|
| 2002/0047840 A1* | 4/2002 | Fukuda | G09G 3/3688 | 345/212 |
| 2002/0145599 A1* | 10/2002 | Endo | G09G 3/3622 | 345/211 |
| 2004/0145583 A1* | 7/2004 | Morita | G09G 3/3688 | 345/211 |
| 2006/0006928 A1* | 1/2006 | Utsuno | G09G 3/3688 | 327/541 |
| 2006/0274014 A1* | 12/2006 | Fujikura | G09G 3/3614 | 345/98 |
| 2006/0274029 A1* | 12/2006 | Hong | G09G 3/20 | 345/104 |
| 2008/0012845 A1* | 1/2008 | Ching-Hui | H05B 45/37 | 345/213 |
| 2008/0089003 A1* | 4/2008 | Kojima | G09G 3/20 | 361/246 |
| 2008/0136744 A1* | 6/2008 | Tomio | G09G 3/2965 | 345/60 |
| 2009/0109142 A1* | 4/2009 | Takahara | G09G 3/006 | 345/76 |
| 2009/0237385 A1* | 9/2009 | Lee | G09G 5/003 | 345/211 |
| 2010/0013791 A1* | 1/2010 | Haga | G06F 3/0412 | 345/174 |
| 2010/0171732 A1* | 7/2010 | Miyazaki | G05F 3/30 | 345/211 |
| 2011/0022867 A1* | 1/2011 | Chang | G09G 5/00 | 713/323 |
| 2012/0139474 A1* | 6/2012 | Cho | G09G 3/2092 | 320/106 |
| 2013/0093519 A1* | 4/2013 | Cheng | H03F 3/45183 | 330/277 |
| 2013/0162175 A1* | 6/2013 | Kim | H05B 47/10 | 315/307 |
| 2013/0162618 A1* | 6/2013 | Seo, II | H03F 1/308 | 345/212 |
| 2014/0022232 A1* | 1/2014 | Uehata | G09G 3/3614 | 345/212 |
| 2014/0085349 A1* | 3/2014 | Shiibayashi | G09G 5/10 | 345/690 |
| 2014/0111724 A1* | 4/2014 | Nishino | G02F 1/1309 | 349/43 |
| 2014/0298065 A1* | 10/2014 | Sakamaki | G06F 1/1626 | 713/323 |
| 2015/0309550 A1* | 10/2015 | Shirakami | G09G 3/3696 | 713/300 |
| 2016/0171952 A1* | 6/2016 | Kuo | G09G 3/20 | 345/209 |
| 2016/0381239 A1* | 12/2016 | Hasegawa | H04N 1/00891 | 358/1.14 |
| 2017/0011691 A1* | 1/2017 | Mamba | G09G 3/3677 | |
| 2017/0345361 A1* | 11/2017 | Choi | G09G 3/2092 | |

* cited by examiner

US 10,713,987 B2

DISPLAY PANEL AND DISPLAY DEVICE

CROSS-REFERENCE TO RELATED APPLICATIONS

This application claims priority to Chinese patent application No. 201711009502.0 filed on Oct. 25, 2017, the disclosure of which is incorporated herein by reference in its entirety.

TECHNICAL FIELD

The present disclosure relates to display technologies, in particular to a display panel and a display device.

BACKGROUND

Commonly, a display panel includes a drive chip (also known as a drive IC) for controlling to display a picture, where a gray scale signal outputted from the drive chip is transmitted to a data line to drive the display panel to display the desired picture. The drive chip includes a digital interface inputting terminal, a positive driving voltage inputting terminal and a negative driving voltage inputting terminal, where a working voltage is provided by a main circuit board to the drive chip through the digital interface inputting terminal, the positive driving voltage inputting terminal and the negative driving voltage inputting terminal.

When the display panel is in a sleep mode, the drive chip may leak current to the data line electrically connected to the drive chip, thereby forming residual charges. When the display panel leaves the sleep mode and turns to display the image, the residual charges may affect normal display of the display panel, and cause flickers, which leads to an abnormal display.

SUMMARY

The present disclosure provides a display panel and a display device, so as to avoid flickers and improve the display effects of the display panel and the display device.

In a first aspect, the present disclosure provides a display panel, and the display panel includes a display region and a non-display region surrounding the display region. The display panel further includes a drive chip configured to control image display, and the drive chip includes a digital interface inputting terminal, a positive driving voltage inputting terminal and a negative driving voltage inputting terminal, and a switching device. The switching device includes a first switching inputting terminal, a second switching inputting terminal, a third switching inputting terminal, a switching control terminal, a first switching outputting terminal corresponding to the first switching inputting terminal, a second switching outputting terminal corresponding to the second switching inputting terminal and a third switching outputting terminal corresponding to the third switching inputting terminal. The first switching inputting terminal, the second switching inputting terminal, the third switching inputting terminal and the switching control terminal are configured to be electrically connected to a main circuit board. The first switching outputting terminal is electrically connected to the digital interface inputting terminal. The second switching outputting terminal is electrically connected to the positive driving voltage inputting terminal. The third switching outputting terminal is electrically connected to the negative driving voltage inputting terminal.

When the display panel is in a sleep mode, the main circuit board controls the switching device to input a ground signal to the digital interface inputting terminal, the positive driving voltage inputting terminal and the negative driving voltage inputting terminal, or the main circuit board controls the digital interface inputting terminal, the positive driving voltage inputting terminal and the negative driving voltage inputting terminal to be disconnected.

When an image display function is performed by the display panel, the main circuit board controls the switching device to input a digital interface power signal to the digital interface inputting terminal, to input a positive driving power signal to the positive driving voltage inputting terminal and to input a negative driving power signal to the negative driving voltage inputting terminal.

In a second aspect, the present disclosure further provides a display device, including the display panel mentioned in the first aspect.

The display panel provided by the present disclosure includes a switching device, and inputting terminals (including a first switching inputting terminal, a second switching inputting terminal and a third switching inputting terminal) of the switching device are configured to be electrically connected to a main circuit board, and outputting terminals (including a first switching outputting terminal, a second switching outputting terminal and a third switching outputting terminal) of the switching device are electrically connected to a drive chip, and a switching control terminal of the switching device is also electrically connected the main circuit board. The switching device is controlled to be turned off through the switching control terminal when the display panel is in a sleep mode, so that the drive chip is in a non-working state. The switching device is controlled to be turned on through the switching control terminal when an image display function is performed by the display panel, so that the drive chip is in a working state. Since a leak current may not be released to the data lines electrically connected to the drive chip when the drive chip is in a non-working state, the flickers may be avoided, thereby improving the display effects of the display panel and the display device.

DETAILED DESCRIPTION

Figure 1:
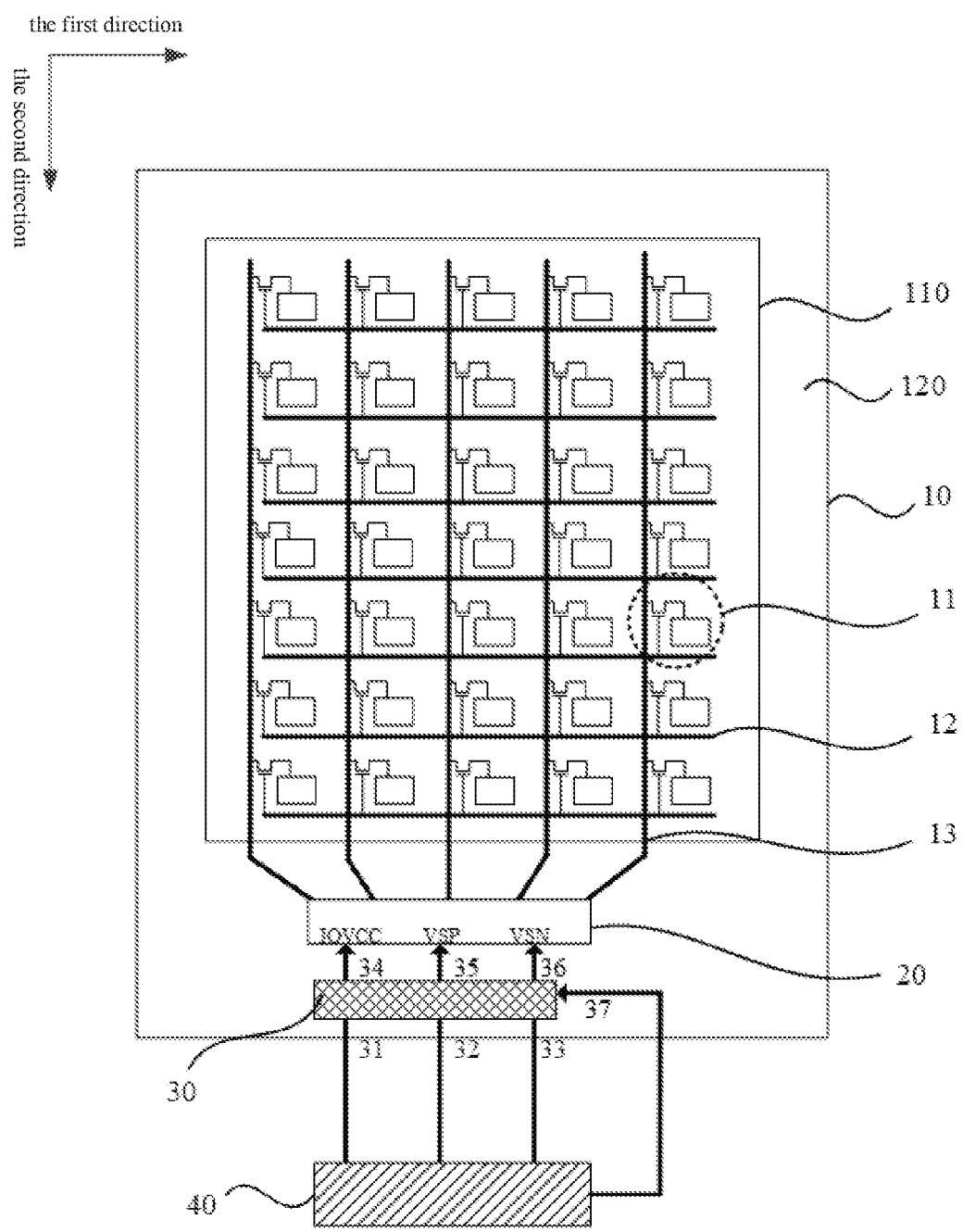
FIG. 1 is a structural diagram showing a display panel according to an embodiment of the present invention.

The present disclosure is further described below in combination with the drawings and embodiments. It should be understood that, the embodiments described herein are merely used to explain the present disclosure rather than limiting the present disclosure. In addition, it should be stated that in order to facilitate the description, merely a part of structures related to the present disclosure rather than the whole structure are illustrated in the drawings.

FIG. 1 is a structural diagram showing a display panel according to an embodiment of the present invention. As shown FIG. 1, the display panel includes a display region 110 and a non-display region 120 surrounding the display region 110. A plurality of scanning lines 12 extending along a first direction and arranging along a second direction, and a plurality of data lines 13 extending along the second direction and arranging along the first direction 100 are disposed in the display region 110. A plurality of pixel devices 11, which are arranged in an array, are formed at the crossing regions between the scanning lines 12 and the data lines 13, and the first direction and the second direction are intersected with each other. The display panel further includes a drive chip 20 for controlling to display a picture, and the drive chip 20 is electrically connected to the data lines 13 in the display panel, a gate electrode driving circuit (not shown in FIG. 1) is electrically connected to the scanning lines 12 in the display panel. When an image display function is performed by the display panel, thin film transistors (TFTs) of a row of the pixel devices 11 in the first direction is turned on by the gate electrode driving circuit via one of the scanning lines 12, and hence gray scale signals are applied by the drive chip 20 via the data lines 13 to the pixel devices 11 of which TFTs are turned on. Then, the gate electrode driving circuit drives the scanning lines 12 one by one, to enable the display panel to display a desired picture. Commonly, a working voltage is provided by a main circuit board 40 to the drive chip 20. The drive chip 20 includes a digital interface inputting terminal IOVCC, a positive driving voltage inputting terminal VSP and a negative driving voltage inputting terminal VSN. The working voltage is provided by a main circuit board 40 to the drive chip 20 through the digital interface inputting terminal IOVCC, the positive driving voltage inputting terminal VSP and the negative driving voltage inputting terminal VSN. The display panel further includes a switching device 30, and the switching device 30 includes a first switching inputting terminal 31, a second switching inputting terminal 32, a third switching inputting terminal 33, a switching control terminal 37, a first switching outputting terminal 34 corresponding to the first switching inputting terminal 31, a second switching outputting terminal 35 corresponding to the second switching inputting terminal 32 and a third switching outputting terminal 36 corresponding to the third switching inputting terminal 33. The first switching inputting terminal 31, the second switching inputting terminal 32, the third switching inputting terminal 33 and the switching control terminal 37 are electrically connected to the main circuit board 40, the first switching outputting terminal 34 is electrically connected to the digital interface inputting terminal IOVCC, the second switching outputting terminal 35 is electrically connected to the positive driving voltage inputting terminal VSP, and the third switching outputting terminal 36 is electrically connected to the negative driving voltage inputting terminal VSN. When the display panel is in a sleep mode, the main circuit board 40 controls the switching device 30 to input a ground signal to the digital interface inputting terminal IOVCC, the positive driving voltage inputting terminal VSP and the negative driving voltage inputting terminal VSN, or the main circuit board 40 controls the digital interface inputting terminal IOVCC, the positive driving voltage inputting terminal VSP and the negative driving voltage inputting terminal VSN to be disconnected. That is, when the display panel is in a sleep mode, the main circuit board 40 controls the switching device 30 to be turned off through the switching control terminal 37, so that the drive chip 20 is in a non-working state. When the image display function is performed by the display panel, the main circuit board 40 controls the switching device 30 to input a digital interface power signal to the digital interface inputting terminal IOVCC, input a positive driving power signal to the positive driving voltage inputting terminal VSP and input a negative driving power signal to the negative driving voltage inputting terminal VSN. That is, when the image display function is performed by the display panel, the main circuit board 40 controls the switching device 30 to be turned on through the switching control terminal 37, so that the drive chip 20 is in a working state. In an embodiment, the voltage value of the digital interface power signal is 1.8V, the voltage value of the positive driving power signal is 5V, and the voltage value of the negative driving power signal is −5V.

The display panel provided by the present disclosure includes the switching device, and inputting terminals (including the first switching inputting terminal, the second switching inputting terminal and the third switching inputting terminal) of the switching device are electrically connected to a main circuit board. Outputting terminals (including the first switching outputting terminal, the second switching outputting terminal and the third switching outputting terminal) of the switching device are electrically connected to a drive chip. A switching control terminal of the switching device is also electrically connected the main circuit board. The switching device is controlled to be turned off through the switching control terminal when the display panel is in a sleep mode, so that the drive chip is in a non-working state. The switching device is controlled to be turned on through the switching control terminal when the image display function is performed by the display panel, so that the drive chip is in a working state. Since current may not be leaked to the data lines electrically connected to the drive chip when the drive chip is in a non-working state, the flickers may be avoided, thereby improving the display effects of the display panel and the display device.

Figure 2:
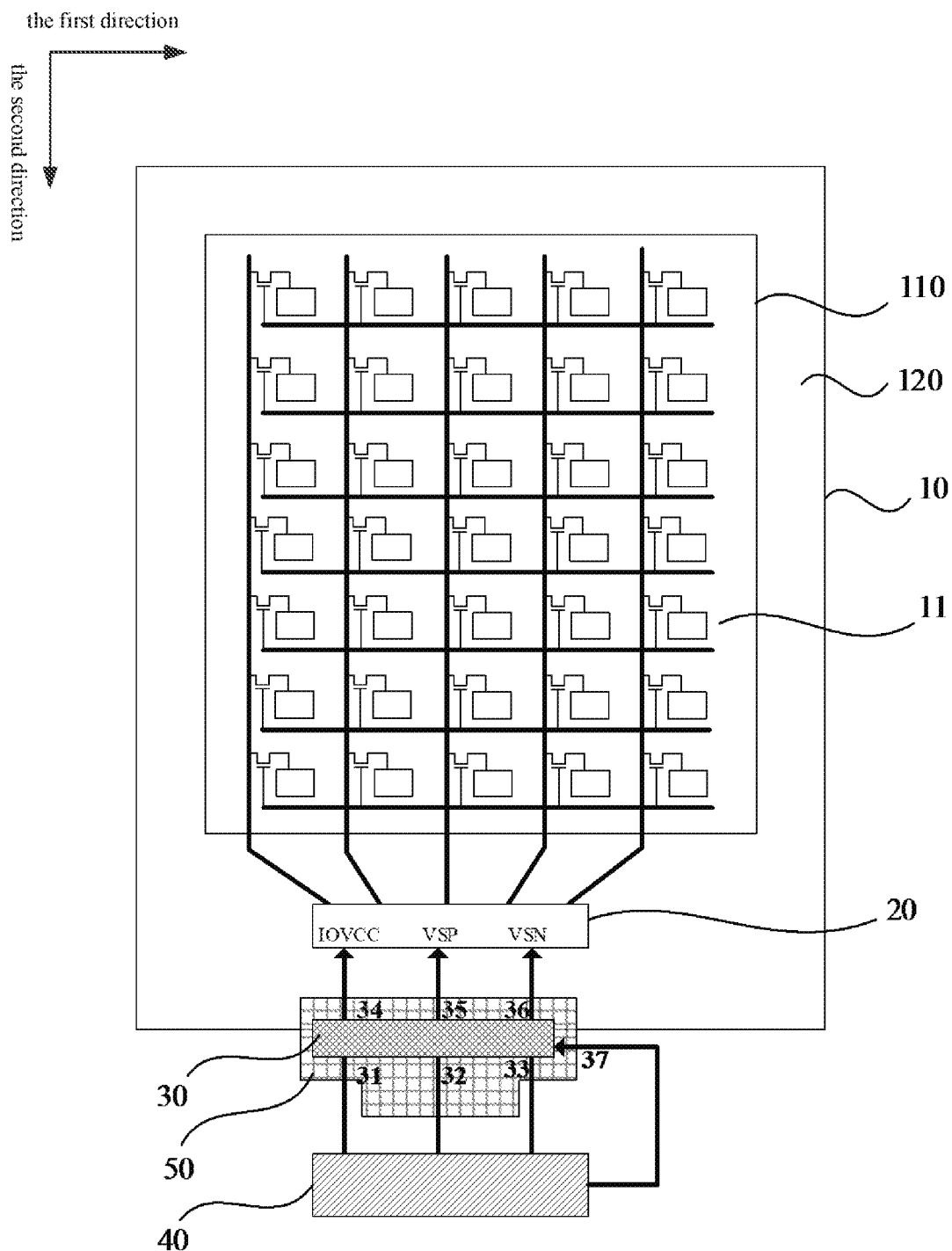
FIG. 2 is a structural diagram showing another display panel according to an embodiment of the present invention.

FIG. 2 is a structural diagram showing another display panel according to an embodiment of the present invention. As shown in FIG. 2, the display panel further includes a flexible printed circuit board (PCB) 50 attached to the non-display region 120. For example, the flexible PCB may be attached to the non-display region by using an anisotropy conducting resin. The anisotropy conducting resin refers to a special conducting resin in which electricity is only conducted in one direction and a resistance is very large in the other direction and hence electricity is little conducted in the other direction, thereby avoiding a short circuit between two conducted connecting points close to each other. The flexible PCB 50 is electrically connected to the drive chip 20 and the main circuit board 40, and the main circuit board 40 is electrically connected to the drive chip 20 through the flexible PCB 50. The switching device 30 is integrated on the flexible PCB 50. The first switching inputting terminal 31, the second switching inputting terminal 32, the third switching inputting terminal 33 and the switching control terminal 37 of the switching device 30 are electrically connected to the main circuit board 40. The first switching outputting terminal 34 is electrically connected to the digital interface inputting terminal IOVCC, and the second switching outputting terminal 35 is electrically connected to the positive driving voltage inputting terminal VSP and the third switching outputting terminal 36 is electrically connected to the negative driving voltage inputting terminal VSN. In other embodiments, it is also possible that the switching device is disposed in other positions. For example, the switching device may be disposed on the main circuit board, or the switching device may be integrated in the drive chip, the disposed position of the switching device may be selected according to the requirements of specific products, which is not limited in the disclosure.

Figure 3:
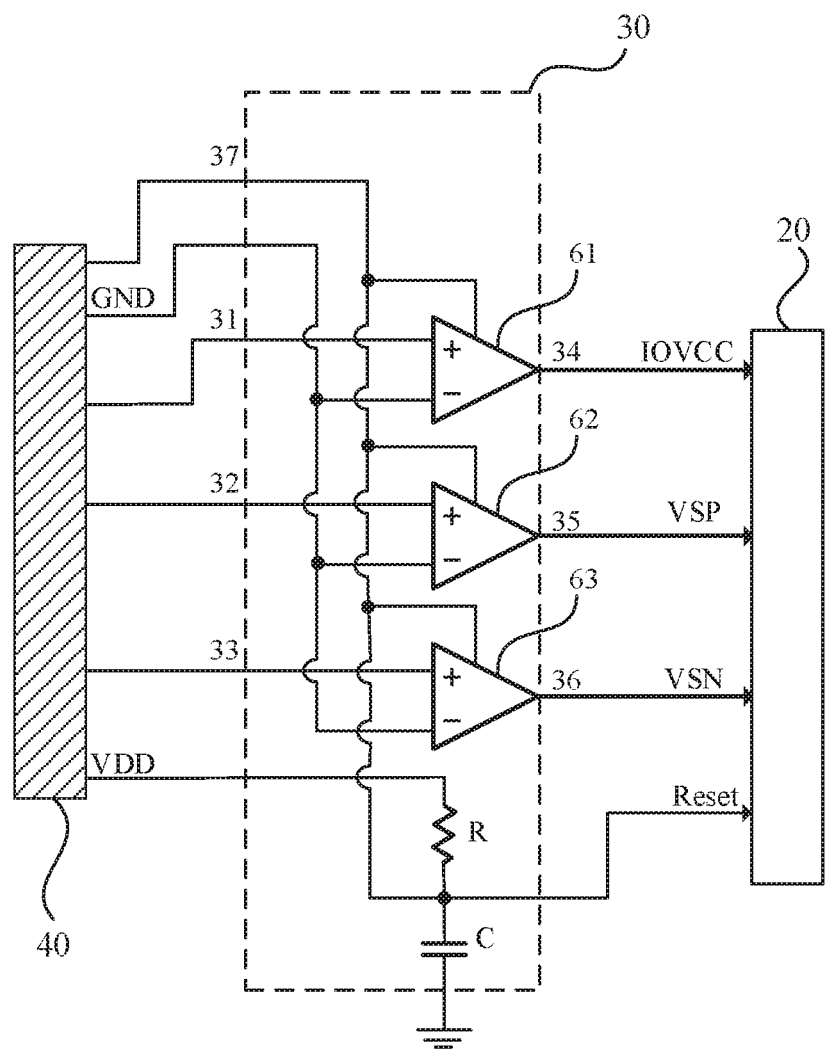
FIG. 3 is a partially structural diagram showing a display panel according to an embodiment of the present invention.

FIG. 3 is a partially structural diagram showing a display panel according to an embodiment of the present invention. As shown in FIG. 3, the switching device 30 includes a first selector 61, a second selector 62 and a third selector 63. Each of the first selector 61, the second selector 62 and the third selector 63 has a first data inputting terminal "+" and a second data inputting terminal "−". The outputting terminal of each of the first selector 61, the second selector 62 and the third selector 63 is configured to output the data from one of the first data inputting terminal "+" and the second data inputting terminal "−" thereof. The first data inputting terminal "+" of the first selector 61 functions as the first switching inputting terminal 31, and the first data inputting terminal "+" of the second selector 62 functions as the second switching inputting terminal 32, and the first data inputting terminal "+" of the third selector 63 functions as the third switching inputting terminal 33. An outputting terminal of the first selector 61 functions as the first switching outputting terminal 34, and an outputting terminal of the second selector 62 functions as the second switching outputting terminal 35, and an outputting terminal of the third selector 63 functions as the third switching outputting terminal 36. A control terminal of the first selector 61, a control terminal of the second selector 62 and a control terminal of the third selector 63 are electrically connected together and then function as the switching control terminal 37. The second data inputting terminal "−" of the first selector 61, the second data inputting terminal "−" of the second selector 62 and the second data inputting terminal "−" of the third selector 63 are electrically connected together and then electrically connected to a first voltage level outputting terminal GND on the main circuit board, and a ground signal is outputted from the first voltage level outputting terminal. Exemplarily, when the image display function is performed by the display panel, a first control signal (a voltage range thereof is 0 to 0.3*VDD1, where VDD1=1.8V) is applied by the main circuit board 40 to the switching control terminal 37, and the data of the first data inputting terminal "+" of the first selector 61 is outputted from the outputting terminal of the first selector 61, and the data of the first data inputting terminal "+" of the second selector 62 is outputted from the outputting terminal of the second selector 62, and the data of the first data inputting terminal "+" of the third selector 63 is outputted from the outputting terminal of the third selector 63, so that a digital interface power signal is inputted to the digital interface inputting terminal IOVCC, a positive driving power signal is inputted to the positive driving voltage inputting terminal VSP and a negative driving power signal is inputted to the negative driving voltage inputting terminal VSN. At this time, the drive chip 20 is in a working state.

When the display panel is in a sleeping mode, a second control signal (a voltage range thereof is 0.7*VDD1 to 1*VDD1, where VDD1=1.8V) is applied by the main circuit board 40 to the switching control terminal 37, and the data of the second data inputting terminal "−" of the first selector 61 is outputted from the outputting terminal of the first selector 61, and the data of the second data inputting terminal "−" of the second selector 62 is outputted from the outputting terminal of the second selector 62, and the data of the second data inputting terminal "−" of the third selector 63 is outputted from the outputting terminal of the third selector 63, so that a ground signal is inputted to the digital interface inputting terminal IOVCC, the positive driving voltage inputting terminal VSP and the negative driving voltage inputting terminal VSN. At this time, the drive chip 20 is in a non-working state.

In an embodiment, referring to FIG. 3, the switching device 30 further includes a reset resistor R and a reset capacitor C, and a first end of the reset resistor R is electrically connected to a second voltage level outputting terminal VDD on the main circuit board 40, and a second end of the reset resistor R is electrically connected to a first electrode plate of the reset capacitor C and a reset terminal Reset of the drive chip 20, and a second electrode plate of the reset capacitor is electrically connected to the ground. The second end of the reset resistor R is also electrically connected to the control terminal of the first selector 61, the control terminal of the second selector 62 and the control terminal of the third selector 63. That is, the second end of the reset resistor R is electrically connected to the switching control terminal 37. Exemplarily, when the display panel leaves the sleep mode and turns to display the image, the voltage applied on the switching control terminal 37 by the main circuit board 40 is changed from the second control signal (the voltage range thereof is 0.7*VDD1 to 1*VDD1, where VDD1=1.8V) to the first control signal (the voltage range thereof is 0 to 0.3*VDD1, where VDD1=1.8V), and the voltage level of the reset terminal Reset of the drive chip 20 is changed from a high level voltage to a low level, so that the drive chip is reset, and hence the drive chip 20 is recovered to an original state.

Figure 4:
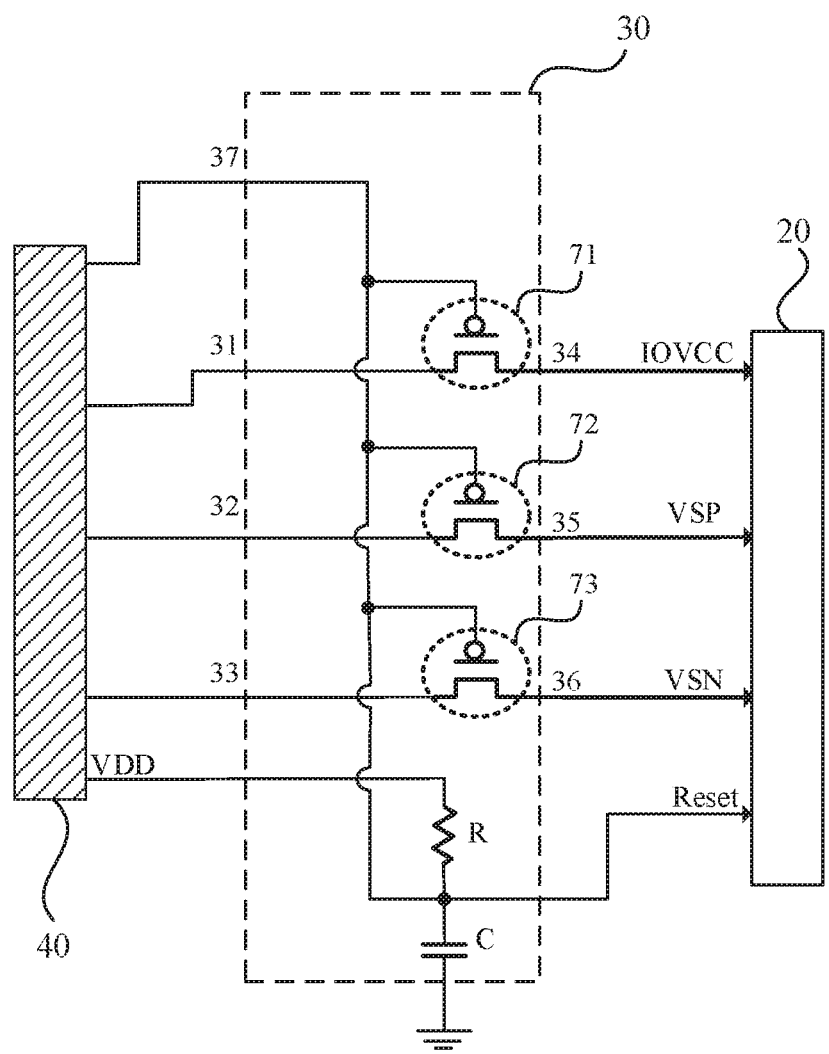
FIG. 4 is a partially structural diagram showing another display panel according to an embodiment of the present invention.

FIG. 4 is a partially structural diagram showing another display panel according to an embodiment of the present invention. As shown in FIG. 4, the switching device 30 includes a first thin film transistor (TFT) 71, a second TFT 72 and a third TFT 73. The first TFT 71, the second TFT 72 and the third TFT 73 are a P-type field-effect tube (FET). An inputting terminal of the first TFT 71 functions as the first switching inputting terminal 31, and an inputting terminal of the second TFT 72 functions as the second switching inputting terminal 32, and an inputting terminal of the third TFT 73 functions as the third switching inputting terminal 33. An outputting terminal of the first TFT 71 functions as the first switching outputting terminal 34, and an outputting terminal of the second TFT 72 functions as the second switching outputting terminal 35, and an outputting terminal of the third TFT 73 functions as the third switching outputting terminal 36. A control terminal of the first TFT 71, a control terminal of the second TFT 72 and a control terminal of the third TFT 73 are electrically connected together and then function as the switching control terminal 37. The inputting terminal of each of the TFTs (including the first TFT 71, the second TFT 72 and the third TFT 73) may be a source electrode of the TFT or a drain electrode of the TFT, the outputting terminal of each of the TFTs may be a drain electrode of the TFT or a source electrode of the TFT, and the control terminal of each of the TFTs may be a gate electrode of the TFT. Exemplarily, when the image display function is performed by the display panel, a third control signal (a low level voltage signal, e.g. 0V) is applied by the main circuit board 40 to the switching control terminal 37, and the first TFT 71, the second TFT 72 and the third TFT 73 are turned on, and hence the digital interface power signal is inputted to the digital interface inputting terminal IOVCC, the positive driving power signal is inputted to the positive driving voltage inputting terminal VSP and the negative driving power signal is inputted to the negative driving voltage inputting terminal VSN. When the display panel is in a sleep mode, a fourth control signal (a high level voltage signal, e.g. 1.8V) is applied by the main circuit board 40 to the switching control terminal 37, and the first TFT 71, the second TFT 72 and the third TFT 73 are turned off, and hence the digital interface inputting terminal IOVCC, the positive driving voltage inputting terminal VSP and the negative driving voltage inputting terminal VSN are suspended. It should be understood, in other embodiments, each of the first TFT 71, the second TFT 72 and the third TFT 73 may be an N-type FET, and the third control signal may be configured as a high level voltage signal (e.g. 1.8V), and the fourth control signal may be configured as a low level voltage signal (e.g. 0V), so that the switching device is "turned on" when the image display function is performed by the display panel, and the switching device is "turned off" when the display panel is in a sleep mode.

Figure 5:
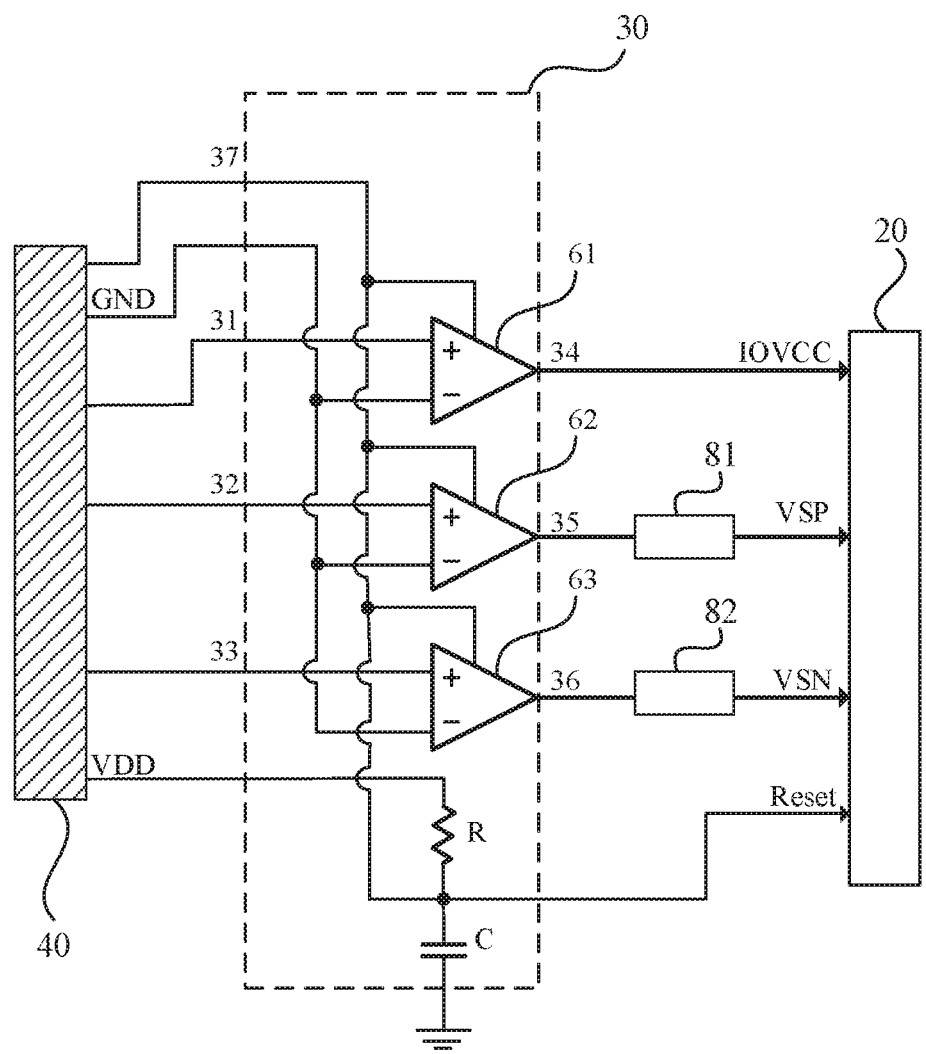
FIG. 5 is a partially structural diagram showing another display panel according to an embodiment of the present invention.
Figure 6:
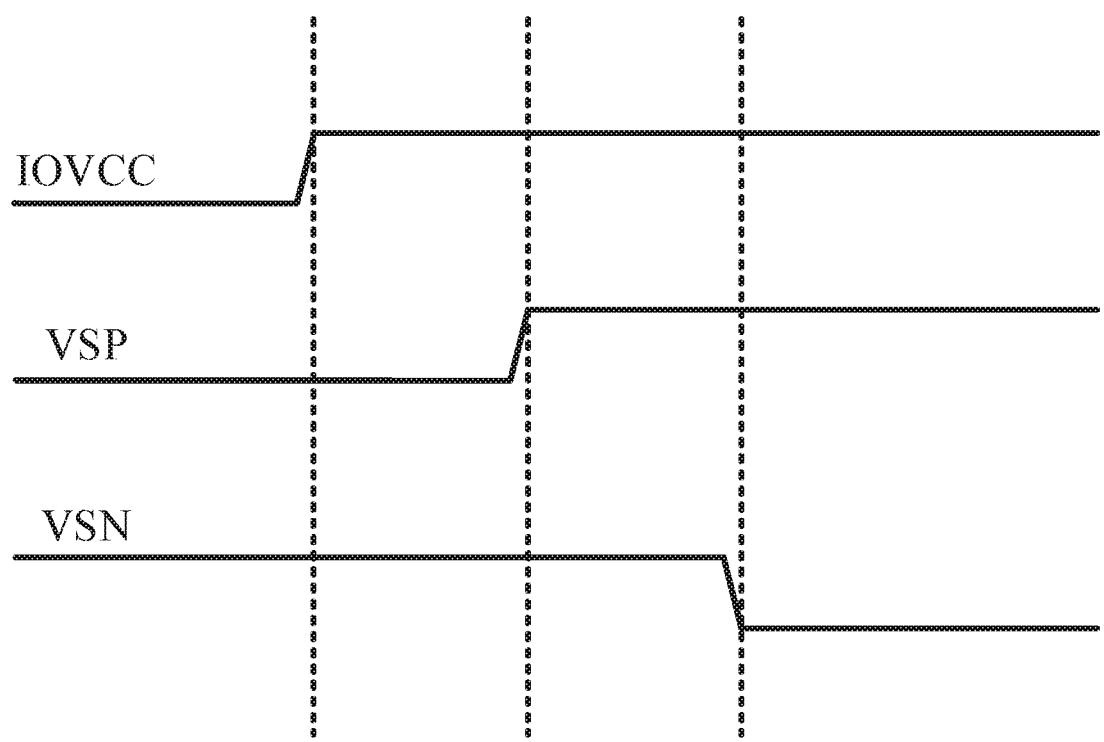
FIG. 6 is a working timing diagram for a drive chip shown in FIG. 5.

FIG. 5 is a partially structural diagram showing another display panel according to an embodiment of the present invention, and FIG. 6 is a working timing diagram for a drive chip shown in FIG. 5. Referring to FIG. 5 and FIG. 6, the display panel further includes a first time-delay control circuit 81 and a second time-delay control circuit 82. The first time-delay control circuit 81 and the second time-delay control circuit 82 are configured for performing a delay processing of signals inputted thereto. Therefore, the inputted signals of the positive driving voltage inputting terminal VSP and the negative driving voltage inputting terminal VSN are later than the inputted signals of the digital interface inputting terminal IOVCC. Also, an inputting terminal of the first time-delay control circuit 81 is electrically connected to the second switching outputting terminal 35 of the switching device 30, an outputting terminal of the first time-delay control circuit 81 is electrically connected to the positive driving voltage inputting terminal VSP, an inputting terminal of the second time-delay control circuit 82 is electrically connected to the third switching outputting terminal 36 of the switching device 30, and an outputting terminal of the second time-delay control circuit 82 is electrically connected to the negative driving voltage inputting terminal VSN. Exemplarily, the inputted signal of the positive driving voltage inputting terminal VSP is later than that of the digital interface inputting terminal IOVCC, and the inputted signal the negative driving voltage inputting terminal VSN is later than that of the positive driving voltage inputting terminal VSP. When the drive chip 20 is in a working state, the digital interface power signal inputted through the digital interface inputting terminal IOVCC provides a working voltage to a logic circuit within the drive chip 20, the positive driving power signal inputted through the positive driving voltage inputting terminal VSP and the negative driving power signal inputted through the negative driving voltage inputting terminal VSN provide a working voltage to an analog circuit within the drive chip 20. Under a timing driving signal, the analog circuit within the drive chip 20 enables the positive driving power signal and the negative driving power signal to be converted into a gray scale signal for driving pixel devices. Since the analog circuit is controlled by the logic circuit, the first time-delay control circuit and the second time-delay control circuit provided in this embodiment of the present invention enables the logic circuit to be in a working state before the analog circuit, thereby controlling the analog circuit, and avoiding the burning of the analog circuit due to the uncontrolled analog circuit.

Figure 7:
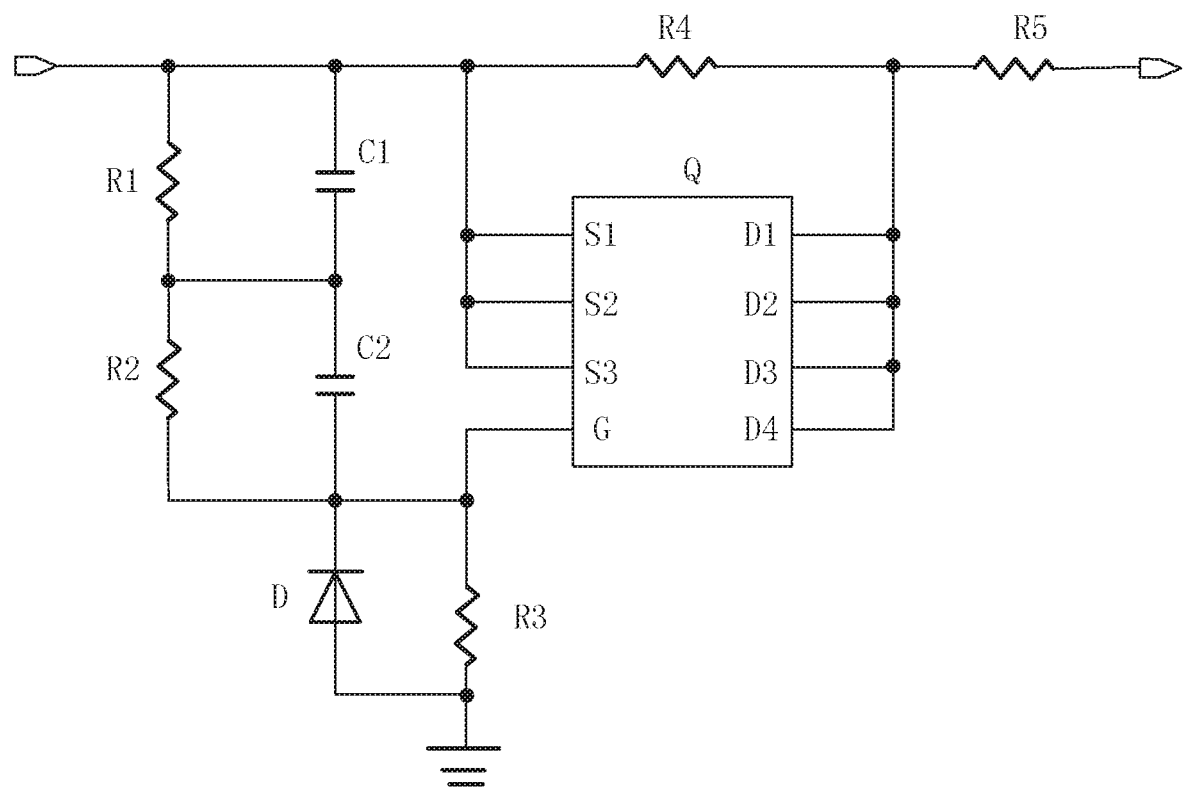
FIG. 7 is a circuit diagram showing a first time-delay control circuit according to an embodiment of the present invention.

FIG. 7 is a circuit diagram showing a first time-delay control circuit according to an embodiment of the present invention. As shown in FIG. 7, the first time-delay control circuit includes: a first resistor R1, a second resistor R2, a diode D, a third resistor R3, a fourth resistor R4, a fifth resistor R5, a first capacitor C1, a second capacitor C2 and a time-delay chip Q. A first end of the first resistor R1 functions as the inputting terminal of the first time-delay control circuit, a second end of the first resistor R1 is electrically connected to a first end of the second resistor R2, and a second end of the second resistor R2 is electrically connected to a cathode of the diode D, and an anode of the diode D is connected to the ground. A first electrode plate of the first capacitor C1 is electrically connected to the first end of the first resistor R1, and a second electrode plate of the first capacitor C1 is electrically connected to a first electrode plate of the second capacitor C2, and a second electrode plate of the second capacitor C2 is electrically connected to the cathode of the diode. A first end of the third resistor R3 is electrically connected to the cathode of the diode D, and a second end of the third resistor R3 is connected to the ground. A first end of the fourth resistor R4 is electrically connected to the first end of the first resistor R1, and a second end of the fourth resistor R4 is electrically connected to a first end of the fifth resistor R5, and a second end of the fifth resistor R5 functions as the outputting terminal of the first time-delay control circuit. The time-delay chip Q includes a first source electrode pin S1, a second source electrode pin S2, a third source electrode pin S3, a gate electrode pin G, a first drain electrode pin D1, a second drain electrode pin D2, a third drain electrode pin D3 and a fourth drain electrode pin D4. The first source electrode pin S1, the second source electrode pin S2 and the third source electrode pin S3 are electrically connected to the first end of the first resistor R1, and the gate electrode pin G is electrically connected to the cathode of the diode D, and the first drain electrode pin D1, the second drain electrode pin D2, the third drain electrode pin D3 and the fourth drain electrode pin D4 are electrically connected to a second end of the fourth resistor R4. In an embodiment, the time-delay chip Q may include a P-type FET, and the gate electrode of the P-type FET is electrically connected to the gate electrode pin G of the time-delay chip Q. The source electrode of the P-type FET is electrically connected to the first source electrode pin S1, the second source electrode pin S2 and the third source electrode pin S3 of the time-delay chip Q. The drain electrode of the P-type FET is electrically connected to the first drain electrode pin D1, the second drain electrode pin D2, the third drain electrode pin D3 and the fourth drain electrode pin D4 of the time-delay chip Q. It should be noted that, the second time-delay control circuit has a same circuit structure with the first time-delay control circuit. The time delay generated by the first time-delay control circuit and the time delay generated by the second time-delay control circuit may be different and may be adjusted by setting different resistance values of the first resistor R1 and the second resistor R2 and different capacitance values of the first capacitor C1 and the second capacitor C2.

In an embodiment, referring to FIG. 1, the display panel further includes a base substrate 10, and a plurality of pixel devices 11 arranged in an array are formed by the crossing regions between the scanning lines 12 and the data lines 13, and the plurality of pixel devices 11 are disposed on either side of the base substrate 10. The drive chip 20 may be disposed on the base substrate 10.

Figure 8:
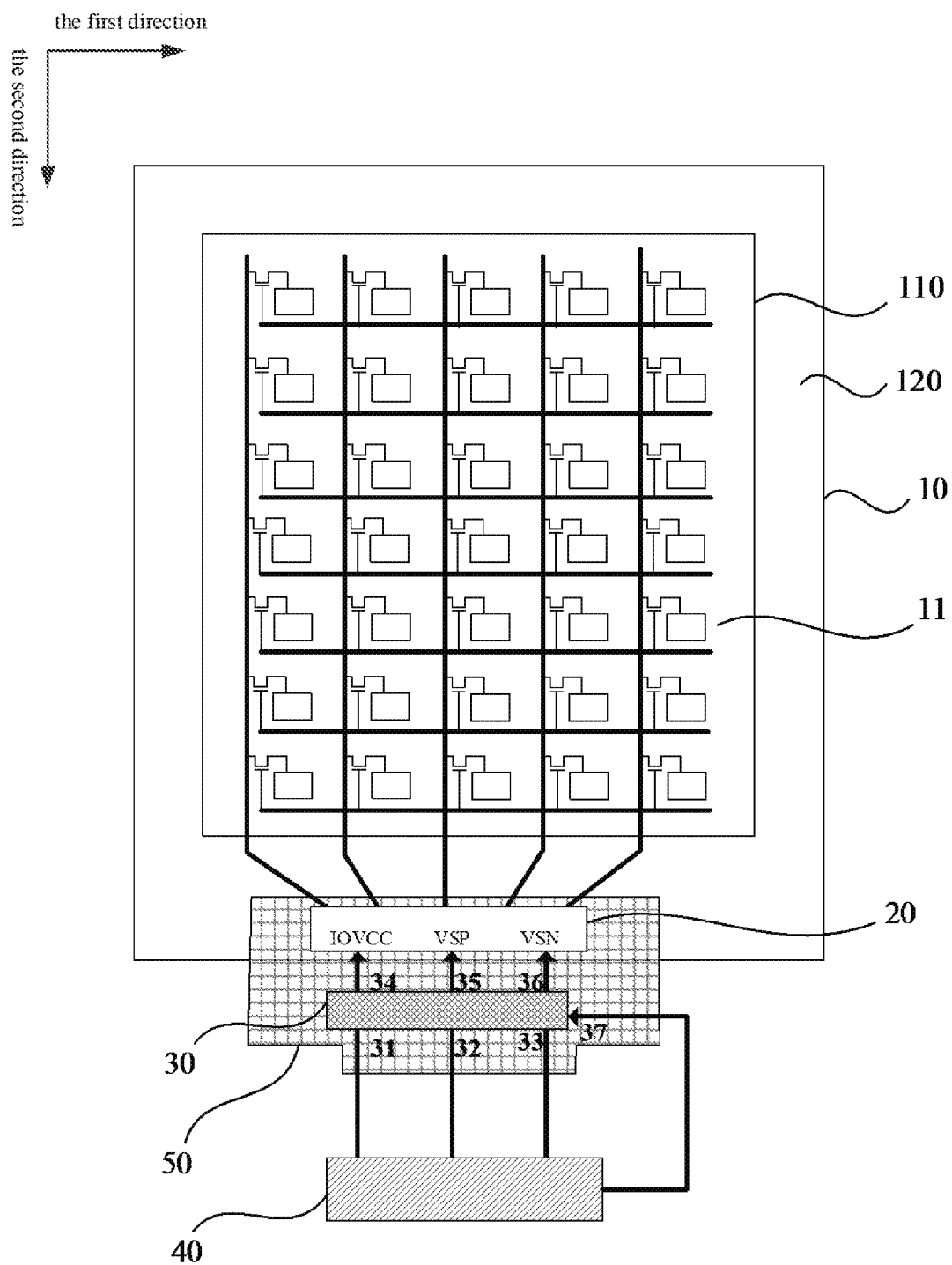
FIG. 8 is a structural diagram showing another display panel according to an embodiment of the present invention.

FIG. 8 is a structural diagram showing another display panel according to an embodiment of the present invention. The difference between the display panel shown in FIG. 8 and the display panel shown in FIG. 1 is that, the drive chip 20 may also be disposed on a flexible PCB. As shown in FIG. 8, the display panel further includes a flexible PCB 50 attached to the non-display region 120, and the drive chip 20 is disposed on the flexible PCB 50. The position of the drive chip may be determined according to the requirements of specific products, which is not limited in the disclosure.

Figure 9:
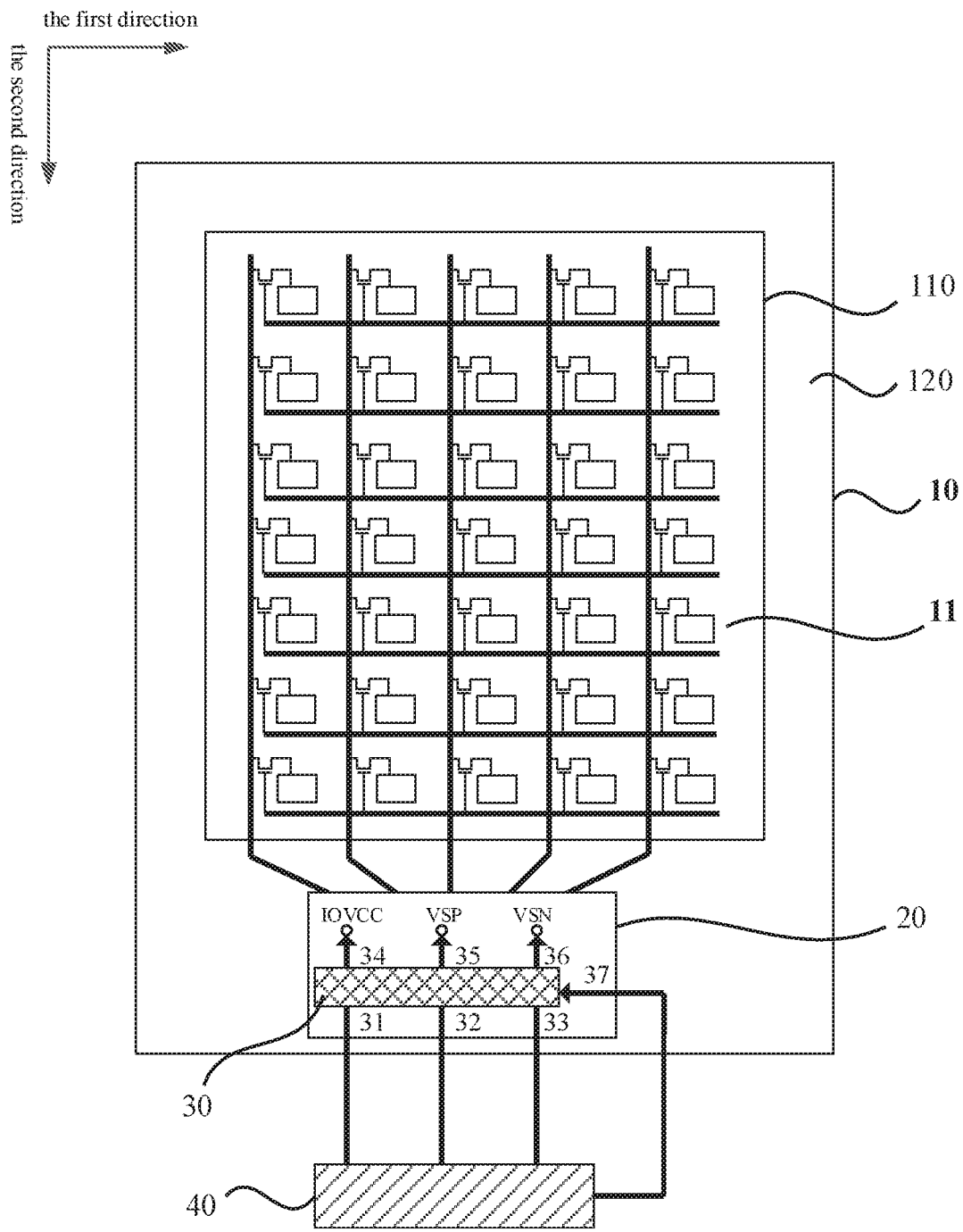
FIG. 9 is a structural diagram showing another display panel according to an embodiment of the present invention.

FIG. 9 is a structural diagram showing another display panel according to an embodiment of the present invention. As shown in FIG. 9, the switching device 30 is integrated into the drive chip 20. The digital interface inputting terminal IOVCC, the positive driving voltage inputting terminal VSP and the negative driving voltage inputting terminal VSN are disposed within the drive chip 20. In an embodiment, the switching device 30 may include a reset resistor and a reset capacitor. The first time-delay control circuit and the second time-delay control circuit may also be integrated in the drive chip 20. The first time-delay control circuit is electrically connected to the second switching outputting terminal 35 of the switching device 30 and the positive driving voltage inputting terminal VSP, and the second time-delay control circuit is electrically connected to the third switching outputting terminal 36 of the switching device 30 and the negative driving voltage inputting terminal VSN.

Figure 10:
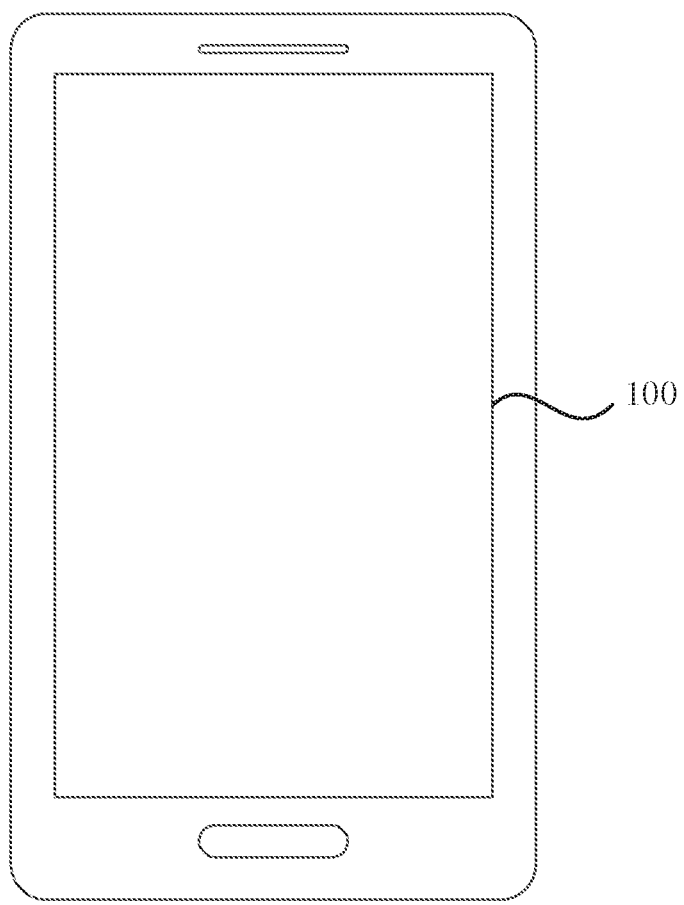
FIG. 10 is a structural diagram showing a display device according to an embodiment of the present invention.

The present disclosure provides a display device, and FIG. 10 is a structural diagram showing a display device according to an embodiment of the present invention. As shown in FIG. 10, the display device provided by the present disclosure includes any one of the display panels shown in the above embodiments of the present invention, and the display device may be a mobile phone shown in FIG. 1, a computer, a television, a smart wearable device, etc., which is not limited in the disclosure.

What is claimed is:

1. A display panel, comprising:
a display region and a non-display region surrounding the display region;
a drive chip configured to control image display, wherein the drive chip comprises a digital interface inputting terminal, a positive driving voltage inputting terminal and a negative driving voltage inputting terminal; and
a switching device, wherein the switching device comprises a first switching inputting terminal, a second switching inputting terminal, a third switching inputting terminal, a switching control terminal, a first switching outputting terminal corresponding to the first switching inputting terminal, a second switching outputting terminal corresponding to the second switching inputting terminal and a third switching outputting terminal corresponding to the third switching inputting terminal; and wherein the first switching inputting terminal, the second switching inputting terminal, the third switching inputting terminal and the switching control terminal are configured to be electrically connected to a main circuit board, the first switching outputting terminal is electrically connected to the digital interface inputting terminal, the second switching outputting terminal is electrically connected to the positive driving voltage inputting terminal, and the third switching outputting terminal is electrically connected to the negative driving voltage inputting terminal;
wherein the switching device further comprises a first selector, a second selector and third selector;
wherein a first data inputting terminal of the first selector functions as the first switching inputting terminal, a first data inputting terminal of the second selector functions as the second switching inputting terminal, and a first data inputting terminal of the third selector functions as the third switching inputting terminal;
an outputting terminal of the first selector functions as the first switching outputting terminal, and an outputting terminal of the second selector functions as the second switching outputting terminal, an outputting terminal of the third selector functions as the third switching outputting terminal;
a control terminal of the first selector, a control terminal of the second selector and a control terminal of the third selector are electrically connected together and then function as the switching control terminal;
a second data inputting terminal of the first selector, a second data inputting terminal of the second selector, a second data inputting terminal of the third selector are electrically connected together and then electrically connected to a first voltage level outputting terminal on the main circuit board, and a ground signal is outputted from the first voltage level outputting terminal;
when the display panel is in a sleep mode, the main circuit board controls the switching device to input a ground signal to the digital interface inputting terminal, the positive driving voltage inputting terminal and the negative driving voltage inputting terminal, or the main circuit board controls the digital interface inputting terminal, the positive driving voltage inputting terminal and the negative driving voltage inputting terminal to be disconnected; and
when an image display function is performed by the display panel, the main circuit board controls the switching device to input a digital interface power signal to the digital interface inputting terminal, to input a positive driving power signal to the positive driving voltage inputting terminal and to input a negative driving power signal to the negative driving voltage inputting terminal.

2. The display panel according to claim 1, wherein
the display panel further comprises a flexible printed circuit board (PCB) attached to the non-display region, and
the flexible PCB is electrically connected to the drive chip and the main circuit board, and the switching device is integrated on the flexible PCB.

3. The display panel according to claim 1, wherein
the switching device further comprises a reset resistor and a reset capacitor,
wherein a first end of the reset resistor is electrically connected to a second voltage level outputting terminal on the main circuit board, a second end of the reset resistor is electrically connected to a first electrode plate of the reset capacitor and a reset terminal of the drive chip, and a second electrode plate of the reset capacitor is electrically connected to the ground.

4. The display panel according to claim 1, wherein
the display panel further comprises a first time-delay control circuit and a second time-delay control circuit, wherein the first time-delay control circuit and the second time-delay control circuit are configured for performing a delay processing on signals inputted thereto; and
an inputting terminal of the first time-delay control circuit is electrically connected to the second switching outputting terminal of the switching device, an outputting terminal of the first time-delay control circuit is electrically connected to the positive driving voltage inputting terminal, an inputting terminal of the second time-delay control circuit is electrically connected to the third switching outputting terminal of the switching device, and an outputting terminal of the second time-delay control circuit is electrically connected to the negative driving voltage inputting terminal.

5. The display panel according to claim 4, wherein
the first time-delay control circuit comprises: a first resistor, a second resistor, a diode, a third resistor, a fourth resistor, a fifth resistor, a first capacitor, a second capacitor and a time-delay chip;
wherein a first end of the first resistor functions as the inputting terminal of the first time-delay control circuit, a second end of the first resistor is electrically connected to a first end of the second resistor, a second end of the second resistor is electrically connected to a cathode of the diode, and an anode of the diode is connected to the ground;
a first electrode plate of the first capacitor is electrically connected to the first end of the first resistor, a second pad of the first capacitor is electrically connected to a first electrode plate of the second capacitor, and a second electrode plate of the second capacitor is electrically connected to the cathode of the diode;
a first end of the third resistor is electrically connected to the cathode of the diode, and a second end of the third resistor is connected to the ground;
a first end of the fourth resistor is electrically connected to the first end of the first resistor, a second end of the fourth resistor is electrically connected to a first end of the fifth resistor, and a second end of the fifth resistor functions as the outputting terminal of the first time-delay control circuit;
the time-delay chip comprises a first source electrode pin, a second source electrode pin, a third source electrode pin, a gate electrode pin, a first drain electrode pin, a second drain electrode pin, a third drain electrode pin and a fourth drain electrode pin;
the first source electrode pin, the second source electrode pin and the third source electrode pin are electrically connected to the first end of the first resistor, the gate electrode pin is electrically connected to the cathode of the diode, and the first drain electrode pin, the second drain electrode pin, the third drain electrode pin and the fourth drain electrode pin are electrically connected to a second end of the fourth resistor; and
the second time-delay control circuit has a same circuit structure with the first time-delay control circuit.

6. The display panel according to claim 1, wherein
the switching device is integrated into the drive chip.

7. The display panel according to claim 1, wherein
the display panel further comprises a base substrate, and pixel devices disposed on one side of the base substrate and arranged in an array, wherein the drive chip is disposed on the base substrate.

8. The display panel according to claim 1, wherein
the display panel further comprises a flexible PCB attached to the non-display region, and drive chip is disposed on the flexible PCB.

9. A display device, comprising:
a display panel, wherein the display panel comprises:
a display region and a non-display region surrounding the display region,
a drive chip configured to control image display, wherein the drive chip comprises a digital interface inputting terminal, a positive driving voltage inputting terminal and a negative driving voltage inputting terminal, and
a switching device, wherein the switching device comprises a first switching inputting terminal, a second switching inputting terminal, a third switching inputting terminal, a switching control terminal, a first switching outputting terminal corresponding to the first switching inputting terminal, a second switching outputting terminal corresponding to the second switching inputting terminal and a third switching outputting terminal corresponding to the third switching inputting terminal; and wherein the first switching inputting terminal, the second switching inputting terminal, the third switching inputting terminal and the switching control terminal are configured to be electrically connected to a main circuit board, the first switching outputting terminal is electrically connected to the digital interface inputting terminal, the second switching outputting terminal is electrically connected to the positive driving voltage inputting terminal, and the third switching outputting terminal is electrically connected to the negative driving voltage inputting terminal;
wherein the switching device further comprises a first selector, a second selector and third selector;
wherein a first data inputting terminal of the first selector functions as the first switching inputting terminal, a first data inputting terminal of the second selector functions as the second switching inputting terminal, and a first data inputting terminal of the third selector functions as the third switching inputting terminal;
an outputting terminal of the first selector functions as the first switching outputting terminal, and an outputting terminal of the second selector functions as the second switching outputting terminal, an outputting terminal of the third selector functions as the third switching outputting terminal;
a control terminal of the first selector, a control terminal of the second selector and a control terminal of the third selector are electrically connected together and then function as the switching control terminal;
a second data inputting terminal of the first selector, a second data inputting terminal of the second selector, a second data inputting terminal of the third selector are electrically connected together and then electrically connected to a first voltage level outputting terminal on the main circuit board, and a ground signal is outputted from the first voltage level outputting terminal;
when the display panel is in a sleep mode, the main circuit board controls the switching device to input a ground signal to the digital interface inputting terminal, the positive driving voltage inputting terminal and the negative driving voltage inputting terminal, or the main circuit board controls the digital interface inputting terminal, the positive driving voltage inputting terminal and the negative driving voltage inputting terminal to be disconnected; and when an image display function is performed by the display panel, the main circuit board controls the switching device to input a digital interface power signal to the digital interface inputting terminal, to input a positive driving power signal to the positive driving voltage inputting terminal and to input a negative driving power signal to the negative driving voltage inputting terminal.

10. The display device according to claim 9, wherein the display panel further comprises a flexible printed circuit board (PCB) attached to the non-display region, and
the flexible PCB is electrically connected to the drive chip and the main circuit board, and the switching device is integrated on the flexible PCB.

11. The display device according to claim 9, wherein the display panel further comprises a base substrate, and pixel devices disposed on one side of the base substrate and arranged in an array, wherein the drive chip is disposed on the base substrate.

12. The display device according to claim 9, wherein the display panel further comprises a flexible PCB attached to the non-display region, and drive chip is disposed on the flexible PCB.

13. A display panel, comprising:
a display region and a non-display region surrounding the display region;
a drive chip configured to control image display, wherein the drive chip comprises a digital interface inputting terminal, a positive driving voltage inputting terminal and a negative driving voltage inputting terminal; and
a switching device, wherein the switching device comprises a first switching inputting terminal, a second switching inputting terminal, a third switching inputting terminal, a switching control terminal, a first switching outputting terminal corresponding to the first switching inputting terminal, a second switching outputting terminal corresponding to the second switching inputting terminal and a third switching outputting terminal corresponding to the third switching inputting terminal; and wherein the first switching inputting terminal, the second switching inputting terminal, the third switching inputting terminal and the switching control terminal are configured to be electrically connected to a main circuit board, the first switching outputting terminal is electrically connected to the digital interface inputting terminal, the second switching outputting terminal is electrically connected to the positive driving voltage inputting terminal, and the third switching outputting terminal is electrically connected to the negative driving voltage inputting terminal;
wherein the switching device further comprises a first thin film transistor (TFT), a second TFT and a third TFT;
wherein an inputting terminal of the first TFT functions as the first switching inputting terminal, an inputting terminal of the second TFT functions as the second switching inputting terminal, and an inputting terminal of the third TFT functions as the third switching inputting terminal;
an outputting terminal of the first TFT functions as the first switching outputting terminal, and an outputting terminal of the second TFT functions as the second switching outputting terminal, an outputting terminal of the third TFT functions as the third switching outputting terminal; and
a control terminal of the first TFT, a control terminal of the second TFT and a control terminal of the third TFT are electrically connected together and then function as the switching control terminal;
when the display panel is in a sleep mode, the main circuit board controls the switching device to input a ground signal to the digital interface inputting terminal, the positive driving voltage inputting terminal and the negative driving voltage inputting terminal, or the main circuit board controls the digital interface inputting terminal, the positive driving voltage inputting terminal and the negative driving voltage inputting terminal to be disconnected; and
when an image display function is performed by the display panel, the main circuit board controls the switching device to input a digital interface power signal to the digital interface inputting terminal, to input a positive driving power signal to the positive driving voltage inputting terminal and to input a negative driving power signal to the negative driving voltage inputting terminal.

14. The display panel according to claim 13, wherein the switching device further comprises a reset resistor and a reset capacitor,
wherein a first end of the reset resistor is electrically connected to a second voltage level outputting terminal on the main circuit board, a second end of the reset resistor is electrically connected to a first electrode plate of the reset capacitor and a reset terminal of the drive chip, and a second electrode plate of the reset capacitor is electrically connected to the ground.

15. The display panel according to claim 13, wherein the display panel further comprises a first time-delay control circuit and a second time-delay control circuit,
wherein the first time-delay control circuit and the second time-delay control circuit are configured for performing a delay processing on signals inputted thereto; and
an inputting terminal of the first time-delay control circuit is electrically connected to the second switching outputting terminal of the switching device, an outputting terminal of the first time-delay control circuit is electrically connected to the positive driving voltage inputting terminal, an inputting terminal of the second time-delay control circuit is electrically connected to the third switching outputting terminal of the switching device, and an outputting terminal of the second time-delay control circuit is electrically connected to the negative driving voltage inputting terminal.

16. The display panel according to claim 13, wherein each of the first TFT, the second TFT and the third TFT are a P-type field-effect tube (FET).

17. The display panel according to claim 13, wherein each of the first TFT, the second TFT and the third TFT are an N-type field-effect tube.

* * * * *